Nov. 30, 1954 W. D. WINGER ET AL 2,695,992

PEAK SENSING CIRCUIT

Filed Dec. 21, 1951 2 Sheets-Sheet 1

INVENTORS
WAYNE D. WINGER
MAX. E. FEMMER
BY James A. Ruth
AGENT

Nov. 30, 1954 W. D. WINGER ET AL 2,695,992

PEAK SENSING CIRCUIT

Filed Dec. 21, 1951 2 Sheets-Sheet 2

INVENTORS
WAYNE D. WINGER
MAX E. FEMMER
BY James A. Kuch
AGENT

United States Patent Office 2,695,992
Patented Nov. 30, 1954

2,695,992

PEAK SENSING CIRCUIT

Wayne D. Winger, Poughkeepsie, and Max E. Femmer, Hopewell Junction, N. Y., assignors to International Business Machines Corporation, New York, N. Y., a corporation of New York Application December 21, 1951, Serial No. 262,832
4 Claims. (Cl. 340—174)

This invention relates to a circuit for the precision sensing of discrete data recorded in a paramagnetic medium and is directed particularly to a circuit means for accurately determining the peak of a wave resulting from the sensing of a small area recording.

In the operation of certain types of electronic computing machines, it is desirable to represent the digit data to be introduced into the machine by combinational codes; for example, perforations in a paper tape, or discrete areas of magnetic recording on a paramagnetic tape. Oftentimes, when a paramagnetic tape is used, it is desired to reduce the size of the area of the recording to the smallest possible area so as to be able to store large amounts of data on relatively short tapes.

It has been found that when the recording area is reduced beyond a certain size that an undesirable spreading of the recording in the paramagnetic medium is encountered. When such small area closely spaced recordings are reproduced in the normal fashion inaccuracies both within a single code group and between adjacent code groups are likely to occur.

Accordingly, it is a feature of the invention to provide means for accurately sensing a plurality of small area recordings.

Another feature of the invention resides in the provision of means for producing a voltage accurately representative of the center of such small area recordings.

Yet another feature of the invention resides in the provision of means for producing a sharp impulse coincident in time with the center of a recording as the recording is being sensed.

Still another feature of the invention resides in the provision of means for determining the time position of the peak of an input wave.

Yet another feature of the invention resides in the provision of means for sensing discrete small area manifestations recorded on a tape at a density exceeding 500 per linear inch.

Other objects of the invention will be pointed out in the following description and claims and illustrated in the accompanying drawings, which disclose, by way of example, the principle of the invention and the best mode, which has been contemplated, of applying that principle.

Figure 1:
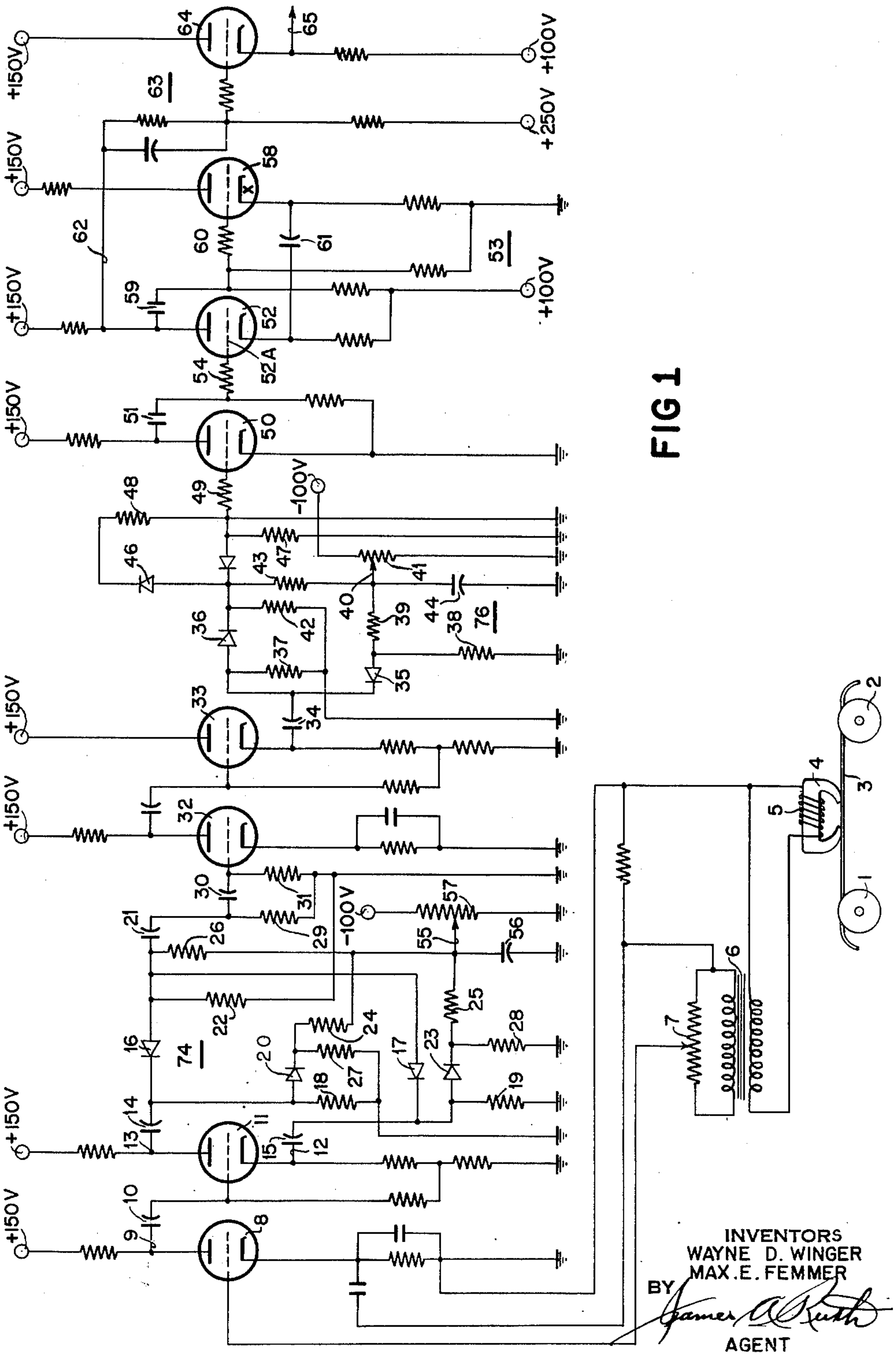
Fig. 1 is a circuit diagram of the invention.

Referring now to Fig. 1, a tape transport mechanism is diagrammatically represented by supply and take-up reels 1 and 2 for transporting a paramagnetic tape 3 past a sensing head 4 which is provided with a coil 5 whose terminals are connected to an input transfer 6, the secondary winding of which has a gain control potentiometer 7 connected thereacross. The movable tap of the potentiometer is connected to the control grid of an amplifier tube 8 connected in a conventional resistance coupled circuit. A wire 9 is taken from the anode of amplifier tube 8 through a condenser 10 to the grid of tube 11 which is connected to operate as a phase splitter, i. e., a pair of outputs 12 and 13 are taken from this tube, one from the anode and the second from the cathode. The cathode phase is the same as the input phase while the phase of the signal present on the anode is reversed by 180 degrees. Coupled to each of these outputs through condensers 14 and 15 is a pair of rectifiers 16 and 17 forming a mixing and clipping circuit.

The signals to be combined are impressed upon input terminals 12 and 13 each connected respectively through condensers 14 and 15 to the diode rectifiers 16 and 17. Resistors 18 and 19 respectively, are connected from the diode rectifier input terminals to ground thereby providing a shunt for the same.

The cathode of diode 16 is connected to the plate of diode 20 and to the junction of condenser 14. The plate of diode 16 is connected to one side of coupling condenser 21 and to a resistor 22, the other end of which is grounded. Similarly, the plate of diode 17 is connected to diode 16, to the coupling condenser 21 to resistor 22. The cathode of diode 17 and the plate of diode 23 are connected together and to resistor 19.

The cathodes of diodes 20 and 23 are connected together through resistors 24 and 25 connected in series relation. The junction 55 of resistors 24 and 25 is connected to coupling condenser 21 via a resistor 26. Junction 55 is bypassed to ground via a condenser 56 and is adapted to receive a negative bias voltage as may be determined by connection to a movable tap of potentiometer 57.

The cathodes of diodes 20 and 23 are also connected to ground respectively via resistors 27 and 28.

The output from the mixing circuit is taken through condenser 21 shunted to ground over resistor 29 to a differentiating combination comprising a very small capacitor 30 shunted to ground over a large value of resistance 31, thereupon the differentiated signals are amplified by a pair of tubes 32 and 33, the latter tube acting as a cathode follower for presenting a low impedance to the following balanced clipper circuit. Tube 32 is a class A amplifier wired in a conventional resistance coupled circuit while tube 33 is a conventional cathode coupled amplifier.

The input to the limiter and clipper circuit is taken from the cathode of tube 33 through a condenser 34. The other side of the condenser 34 is connected to the cathode of a diode 35 and the anode of another diode 36 as well as to a shunting resistor 37. The anode of diode 35 is connected to the midpoint of a voltage divider including resistors 38 and 39. The other end of resistor 38 is connected to ground while the other end of resistor 39 is connected to the variable tap 40 of potentiometer 41 connected between ground and a source of bias potential (not shown). The cathode of diode 36 is similarly connected to the midpoint of another voltage divider composed of resistors 42 and 43. One end of resistor 42 is connected to ground while one end of resistor 43 is connected to variable tap 40 abovementioned. A decoupling bypass condenser 44 is connected between the abovementioned variable tap 40 and ground.

A circuit is extended from the cathode of diode 36 to a second pair of reversely connected diodes 45 and 46. The anode of diode 45 and the cathode of diode 46 are connected through resistors 47 and 48 to ground. Also the anode of diode 45 is extended via resistor 49 to the control grid of tube 50.

The signal from the clipper is passed through an amplifier circuit comprising tube 50 wherein the low level pulses produced by the clipper are amplified. These amplified pulses are transmitted through condenser 51 to one grid 52 of a cathode coupled multivibrator 53 via a grid current limiting resistor 54. Multivibrator 53 comprises a pair of triode tubes 52 and 58 having a single cross-coupling via condenser 59 and resistor 60 from the anode of tube 52 to the grid of tube 58 and also a capacitive coupling 61 between the two cathodes. Being provided with only a single anode-grid cross-coupling multivibrator 53 exhibits a normally maintained stable state and an unstable state which may be established for a time dependent upon the time constant of the coupling capacitor and from which the multivibrator automatically returns to the stable state.

The output from the multivibrator 53 is taken via a wire 62 from the anode of tube 52 through a conventional resistance coupling network 63 to a pulse amplifier 64 having an output lead 65 connected to its cathode.

Data is recorded on a magnetic tape in the form of combinationally represented discrete spots, each group of spots representing, for example, a digit. In normal forms of recording wherein the tape is passed by the reproducing head at a substantial speed, for example, some seven inches per second, no difficulty is encountered in the mixing of one group of spots with the next. However, when the tape is passed by the reproducing head at a very low speed and the density of recording is approximately 500 groups to the linear inch there is a tendency for the individual spots to blend into one another. If it is considered that the tape is divided into a large number of cells and each recorded spot is to be placed at the center of each cell, it is found that there is a tendency for the spots to spread and to occupy portions of cells adjacent to the ones desired. If then with conventional reproducing means these spots are analyzed, difficulty will be encountered in separating one spot from its adjacent ones and further errors may occur thereby due to the sensing of spots at times when none should occur. Consequently it is very much desired to determine the center of each recording and to generate a signal representative of the center of magnetic spot recordings inhibiting at the same time generation of signals due to increase in fringe area of adjacent spots. It has been found that the peak of a reproduced wave corresponds very closely with the geometric center of its recording.

Figure 3A:
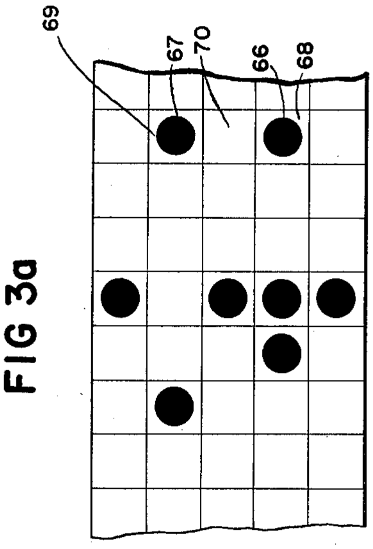
Fig. 3*a* shows a portion of a tape having several combinationally coded recordings thereon.
Figure 3B:
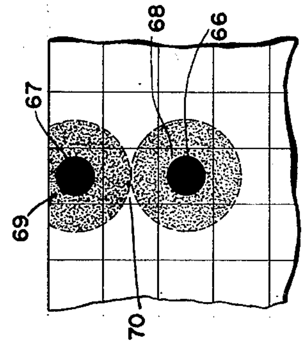
Fig. 3*b* shows a portion of a tape having a high density of small area recordings wherein the magnetized area is diagrammatically shown to have spread beyond assigned cell boundaries.

Fig. 3*a* shows in a diagrammatic form combinations of discrete data recorded at a low density. Spots 66 and 67 are shown placed in cells 68 and 69 respectively and separated from one another by a vacant cell 70. Fig. 3*b* shows in fragmentary form what tends to happen when these same discrete data representations are recorded at a density of some 500 to the linear inch. Spots 66 and 67 are shown to comprise a core area and a fringe area and the fringe areas of both spots have so spread that each occupies about one half of the cell 70 which should be unaffected by any magnetic influence. Hence in the operation of the circuit, it is desired to positively generate a signal representative of the center core of a recorded spot when the same passes by a reproducing head as well as to inhibit generation of waves by the extended fringe area of a spot.

*Operation*

Figure 2:
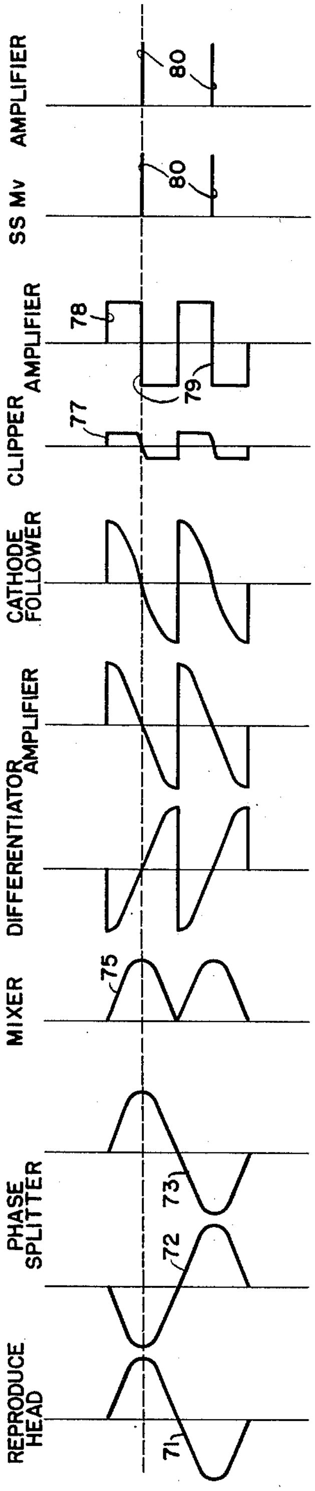
Fig. 2 is a waveform chart showing the different waves produced at various points in the circuit.

A paramagnetic tape having recorded thereon a series of combinational code groups such as is fragmentarily shown in Fig. 3*a* is passed under the reproducing head 4 wherein in coil 5 there is generated a wave 71, Fig. 2, which is passed substantially unchanged through amplifier tube 8. Phase splitting tube 11 having a pair of output leads one connected to the anode the other connected to the cathode produces wave 72 on wire 13 and wave 73 on wire 12. Wave 73 is identical in form with wave 72 but reversed in phase therefrom by 180 degrees. These waves are applied across condensers 14 and 15, respectively connected to the inputs to a diode mixing circuit 75. This mixing circuit is disclosed and claimed in an application Serial 259,745 filed on December 4, 1951 by Max E. Femmer.

As the wave signal impulses applied to inputs 12 and 13 of the mixing circuit are coincident in time but opposite in phase diode 17 would conduct when the amplitude of the signal applied to the cathode was more negative than the anode thereof and an output voltage would appear across resistor 22. Diode 20 would conduct immediately upon application of the positive going pulse on wire 13 and for the duration of the pulse. The creation by this pulse of a voltage across resistor 27 has no effect on the output.

On the next alternation of input pulses input 13 is driven negative while input 12 goes positive. Consequently when the negative amplitude of the pulse applied to input 13 exceeds the negative bias applied to the anode of diode 16, said diode conducts producing a negative going voltage pulse across resistor 22 as shown in Fig. 2.

The mixing circuit has operated in the manner of a full wave rectifier by passing only like halves of the two oppositely phased waves 72, 73 to produce a pulsating D. C. wave 75 which is clamped on an axis determined by the value of the bias voltage.

The combined wave is then differentiated and passed through an amplifier and a tube operating as a cathode follower and then fed into a clipping circuit 76 the features of which are disclosed and claimed in a Patent No. 2,675,473 to Max E. Femmer granted on April 3, 1954. Depending upon the setting of potentiometer top 40 the wave is clipped to the desired amplitude 77 and is then passed through amplifier tube 50 which produces at its anode square waves 78 having vertical sided positive going portions 79 which are coincident in time with the peaks of the wave 71 representative of a recording.

Squared waves 78 are transmitted through condenser 51 and resistor 54 to the grid of one of the tubes 52 comprising the single stability multivibrator 53. Each time a positive going wave front 79 impulses said grid the multivibrator is transferred from its stable state to the unstable state remaining in same for a very small period of time and producing upon the anode of tube 52 spikes 80 which are then passed through cathode follower tube 64 appearing in the same phase relationship on output wire 65.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Electrical pulse generating apparatus responsive to discrete manifestations recorded in a paramagnetic medium for producing discontinuous electrical waves representative of said manifestations said discontinuous waves characteristically rising from a zero value to a finite value and thereafter immediately falling back to said zero value without exponential curvature, comprising, means for sensing said recorded manifestations and generating waves of sinusoidal shape representative of said manifestations, means responsive to said sinusoidal waves for producing a pair of waves differing from each other in phase by 180 degrees, a pair of capacitors for transmitting each of said pair of phase separated waves, a wave signal mixing circuit comprising a pair of diodes connected to each of said capacitors, one of each pair of diodes having a terminal connected to a common output for combining the positive going excursions of each of said phase separated waves to thereby produce a pair of waves in seriatum of identical polarity, a resistor matrix coacting with the other diode of each of said pairs of diodes for applying bias voltages to said circuit and responsive to negative going excursions of said phase separated waves for uniformly loading such condensers throughout each wave cycle, means for differentiating said combined waves, means responsive to said differentiated waves for producing squared waves therefrom and means responsive to said squared waves for producing said discontinuous waves synchronously with the positive and negative peaks of the sinusoidal waves representative of the recorded manifestations.

2. An electronic impulse producing system for producing momentary discontinuous electrical impulses having a minimum of exponential curvature from discrete manifestations recorded in a paramagnetic medium comprising an electromagnetic transducer responsive to said recorded manifestations for generating waves of sinusoidal shape representative of said manifestations, electron discharge phase splitting means comprising at least a grid, a cathode and an anode responsive to said sinusoidal waves for producing at said cathode and at said anode respectively a pair of phase different waves, a pair of capacitors for transmitting each of said pair of phase separated waves, a wave signal mixing circuit comprising a pair of diodes connected to each of said capacitors, one of each pair of diodes having a terminal connected to a common output for combining the positive going excursions of each of said phase separated waves to thereby produce a pair of waves in seriatum of identical polarity, a resistor matrix coacting with the other diode of each of said pairs of diodes for applying bias voltages to said circuit and responsive to negative going excursions of said phase separated waves for uniformly loading such condensers throughout each wave cycle, wave shaping means comprising circuit means for differentiating said combined wave, wave amplitude limiting means comprising a plurality of diode rectifiers responsive to said differentiating circuit means for squaring the differentiated waves, and means responsive to said wave amplitude limiting means comprising a single stability multivibrator for producing momentary discontinuous impulses synchronously with the positive and negative peaks of said sinusoidal waves generated by said electromagnetic transducer.

3. Electronic pulse generating apparatus for producing discontinuous electrical waves having a characteristic of rising abruptly from a zero value to a finite value and thereafter immediately falling back to said zero value without exponential curvature, comprising, in combination, primary source means for generating a wave of sinusoidal shape, electron discharge phase splitting means responsive to said generated sinusoidal wave for producing a pair of sinusoidal waves coincident in time with one another and phased 180 degrees apart, a pair of capacitors for transmitting each of said pair of phase separated waves, a wave signal mixing circuit comprising a pair of diodes connected to each of said capacitors, one of each pair of diodes having a terminal connected to a common output for combining the positive going excursions of each of said phase separated waves to thereby produce a pair of impulses in seriatum of identical polarity, a resistor matrix coacting with the other diode of each of said pairs of diodes for applying bias voltages to said circuit and responsive to negative going excursions of said phase separated waves for uniformly loading such condensers throughout each wave cycle, means for differentiating said pair of impulses, means responsive to said differentiated impulses for producing squared waves, and secondary source means responsive to said squared waves for producing said discontinuous electrical waves.

4. An electronic impulse producing system for producing momentary discontinuous electrical impulses having a minimum of exponential curvature from discrete manifestations recorded in a paramagnetic medium comprising an electromagnetic transducer responsive to said recorded manifestations for generating waves of sinusoidal shape representative of said manifestations, electron discharge phase splitting means comprising at least a grid, a cathode and an anode responsive to said sinusoidal waves for producing at said cathode and at said anode respectively a pair of phase different waves, a pair of capacitors for transmitting each of said pair of phase separated waves, a wave signal mixing circuit comprising a pair of diodes connected to each of said capacitors, one of each pair of diodes having a terminal connected to a common output for combining the positive going excursions of each of said phase separated waves to thereby produce a pair of waves in seriatum of identical polarity, a resistor matrix coacting with the other diode of each of said pairs of diodes for applying bias voltages to said circuit and responsive to negative going excursions of said phase separated waves for uniformly loading such condensers throughout each wave cycle, wave shaping means comprising circuit means for differentiating said combined wave, wave amplitude limiting means comprising an input diode and an output diode having commoned cathodes and arranged in series relation between an input and an output terminal, a source of bias potential, means for applying a proportion of said bias potential, means for applying a proportion of said bias potential to said commoned cathodes, resistor loading means shunting said input and output terminals, and a pair of reversely connected diodes respectively arranged in shunt relation across said input diodes, and means responsive to said wave amplitude limiting means comprising a single stability multivibrator for producing momentary discontinuous impulses synchronously with the positive and negative peaks of said sinusoidal waves generated by said electromagnetic transducer.

References Cited in the file of this patent

UNITED STATES PATENTS

| Number | Name | Date |
|---|---|---|
| 2,226,459 | Bingley | Dec. 24, 1940 |
| 2,408,078 | Labin et al. | Sept. 24, 1946 |
| 2,448,718 | Koulicovitch | Sept. 7, 1948 |
| 2,509,208 | Busignies et al. | May 30, 1950 |
| 2,583,983 | Arndt et al. | Jan. 29, 1952 |